US005394267A

United States Patent [19]

Hanzawa

[11] Patent Number: 5,394,267

[45] Date of Patent: Feb. 28, 1995

[54] STEREOMICROSCOPE

[75] Inventor: Toyoharu Hanzawa, Tokyo, Japan

[73] Assignee: Olympus Optical Co., Ltd., Tokyo, Japan

[21] Appl. No.: 83,275

[22] Filed: Jun. 29, 1993

[51] Int. Cl.[6] .............................................. G02B 21/22

[52] U.S. Cl. .................................... 359/376; 359/380; 359/656; 359/661; 359/690

[58] Field of Search ............... 359/375, 376, 380, 656, 359/661, 690

[56] References Cited

U.S. PATENT DOCUMENTS

| | | | |
|---|---|---|---|
| 4,155,622 | 5/1979 | Klein | 359/379 |
| 4,341,435 | 7/1982 | Lang et al. | 359/376 |
| 4,717,246 | 1/1988 | Fehr et al. | 359/377 |
| 5,216,545 | 6/1993 | Saito | 359/661 |

*Primary Examiner*—Eugene R. LaRoche
*Assistant Examiner*—Christopher R. Glembacki
*Attorney, Agent, or Firm*—Cushman, Darby & Cushman

[57] ABSTRACT

A stereomicroscope comprising an objective lens, an afocal vari-focal optical system disposed coaxially with the objective lens, a pair of right and left imaging optical systems for imaging parallel rays emerging from the afocal vari-focal optical system, and right and left eyepiece lens systems for magnifying images which are formed by the right and left imaging optical systems.

This stereomicroscope permits observing images with adequate stereoscopic impressions and can be relatively compact owing to a fact that the microscope satisfies the following condition (1):

$$0.005 \leqq AD \cdot \beta / f_0 \leqq 0.131 \quad (1)$$

7 Claims, 8 Drawing Sheets

STEREOMICROSCOPE

Background of the Invention a) Field of the Invention:

The present invention relates to a stereomicroscope which has an afocal vari-focal optical system.

b) Description of the prior Art:

Stereomicroscopes which permit three-dimensional comprehension of minute locations are used widely in various fields of research, inspections, surgical operations and so on.

In recent years where high-grade techniques are required in these fields, it is demanded that stereomicroscopes permit observations by a plurality of persons at the same time during work or observation by a single person in a free posture so that he can continue observation for a long time.

In order to satisfy this demand, it is conceivable to configure an optical system for a stereomicroscope wherein an afocal vari-focal optical system 2 is disposed coaxially with an objective lens 1 and a pair of eyepiece lens systems 3 are disposed after the afocal vari-focal optical system 2. However, this optical system does not permit observation with adequate stereoscopic impression due to a fact that heights of rays on the afocal vari-focal optical system 2 are varied by changing a magnification thereof.

The afocal vari-focal optical system used in the optical system described above must have a large effective diameter since it must cover a range within which pupils of two or more eyepiece lens systems are located. As an optical system which uses an afocal vari-focal optical system having a large effective diameter, there is known an optical system disclosed by Japanese Patent Kokai Publication No. Sho 56-165,114. When such an optical system is enlarged while keeping similarity to an original form thereof so that rays to pass into the eyepiece lens systems are not intercepted, however, the optical system has a prolonged total length, thereby locating an eye point far from an object point and constituting an inconvenience for work, in particular, work during observation.

Summary of the Invention

A primary object of the present invention is to provide a stereomicroscope which permits observation with adequate stereoscopic impression and uses a relatively compact afocal vari-focal optical system.

The stereomicroscope according to the present invention is configured on the basis, for example, of an optical system illustrated in FIG. 1. In this drawing, the reference numeral 1 represents an objective lens which is disposed so as to locate a front focal point thereof coincident with an object point and functions to make rays coming from the object point into parallel rays. The reference numeral 2 designates an afocal vari-focal optical system which is disposed coaxially with the objective lens, consists of a positive lens unit, a negative lens unit and a positive lens unit, and is configured so as to be capable of changing an afocal magnification by moving two of the above-mentioned three lens units from the locations traced in solid lines to the locations traced in dashed lines in FIG. 1. The reference numeral 3 denotes an observation optical system which comprises imaging lenses disposed at locations near a pupil and functioning to image the parallel rays emerging from the afocal vari-focal optical system so that right and left images of an object can be observed by right and left eyes. As is seen from FIG. 1, passages for rays which are to be incident on the right and left eyes are off an optical axis of the afocal varifocal optical system. Black marks 100 traced on the side of emergence of the afocal vari-focal optical system represents an entrance pupil of the observation optical system.

The stereomicroscope according to the present invention which has the composition described above satisfies the following condition (1):

$$0.005 \leq AD \cdot \beta / f_0 \leq 0.131 \quad (1)$$

wherein the reference symbol $\beta$ represents an afocal magnification of the afocal vari-focal optical system, the reference symbol AD designates a half of a spacing reserved between optical axes of the eyepiece lens systems, i.e., a spacing reserved between an optical axis of the afocal vari-focal optical system to that of the eyepiece lens system, and the reference symbol $f_0$ denotes a focal length of the objective lens.

In the stereomicroscope having the composition described above, the heights of rays on the afocal optical system are varied by changing a magnification thereof. A spacing which is kept constant between the two eyepiece lens systems provides a merit it that it eliminates a necessity to move complicated mechanisms and another merit in that the eyepiece lens systems are compatible with other stereomicroscopes. However, stereoscopic impression is inevitably varied when a stereomicroscope adopts a single afocal vari-focal optical system in combination with the eyepiece lens systems which are disposed with a constant spacing reserved between a right side optical axis and a left side optical axis.

In a stereomicroscope such as that according to the present invention, there establishes the following relationship:

$$\sin(\theta/2) = AD \times \beta / f$$

wherein the reference symbol f represents a focal length of the objective lens which is disposed before the afocal optical system, the reference symbol AD designates a half of the spacing reserved between the pair of eyepiece lens systems and the reference symbol $\theta$ denotes an angle formed between the right side optical axis and the left side optical axis ($\theta$ will hereinafter be referred to as a stereo angle).

The stereoscopic impression is too weak when the stereo angle is smaller than 0.5° or the stereoscopic impression is too strong when the stereo angle is larger than 15° whereby fusion is possible only within a narrow range and the stereomicroscope is rather inconvenient for practical use in either case.

As is understood from the foregoing description, a stereomicroscope which uses an afocal vari-focal optical system can provide adequate stereoscopic impression within a range satisfying the following condition (1):

$$0.005 \leq AD \cdot \beta / f \leq 0{,}131 \quad (1)$$

Further, the stereomicroscope according to the present invention has another characteristic in that the afocal optical system thereof is composed as described below for shortening a length of the optical system as measured in a direction along an optical system thereof. Speaking concretely, the stereomicroscope according to the present invention uses the afocal vari-focal optical system which is composed, in order from the object side, of a first positive lens unit, a second negative lens unit and a third positive lens unit, and configured so as to satisfy the following condition (2):

$$0.1 \leq -f_2/L \leq 0.25 \quad (2)$$

wherein the reference symbol $f_2$ represents a focal length of the second lens unit and the reference symbol L designates a maximum length meaning a distance from a most objective side surface to a most image side surface of the afocal vari-focal optical system.

If the upper limit of the condition (2) is exceeded, the afocal vari-focal optical system will have a prolonged total length, and the objective lens and the first lens unit will be enlarged, whereby a location for observation will be far from an object to be observed and too high for direct observation of the object. If the lower limit of the condition (2) is exceeded, the second lens unit will have a strengthened refractive power, thereby making it difficult to correct aberrations favorably.

Furthermore, when an aperture stop for the eyepiece lens systems has a diameter of A, and each of A/L and AD/L has a value of 0.15 or smaller for practical use, it is desirable that the above-mentioned second lens unit is composed of two lens components, i.e., two lens components each consisting of a single lens element, two cemented lens components or one lens component consisting of a single lens element and a cemented lens component. In particular, it is desirable to configure a lens component to be disposed on the image side in the second lens unit as a meniscus lens component. It is more desirable to configure the second lens unit so as to satisfy the following conditions (3), (4) and (5):

$$0.5 \leq -R_2/R_3 \leq 2 \quad (3)$$

$$0.07 \leq -R_3/L \leq 0.2 \quad (4)$$

$$0.12 \leq -R_4/L \leq 0.25 \quad (5)$$

wherein the reference symbol $R_2$ represents a radius of curvature on an image side surface of the lens component which is disposed on the object side in the second lens unit, and the reference symbols $R_3$ and $R_4$ designate radii of curvature on an object side surface and an image side surface respectively of the lens component which is disposed on the image side in the second lens unit.

Since the second lens unit must have a rather short focal length and a strong refractive power, it is preferable to divide the refractive power of the second lens unit between the two lens components.

The condition (3) is required for balancing the refractive powers of the two lens components. If the upper limit of the condition (3) is exceeded, the refractive power of the second lens unit will be concentrated mostly on the lens component disposed on the object side in the second lens unit or if the lower limit of the condition (3) is exceeded, the refractive power of the second lens unit will be concentrated mostly on the lens component disposed on the image side in the second lens unit, whereby it will be impossible to correct aberrations with good balance in either case.

The condition (4) defines a radius of curvature on the object side surface of the lens component which is disposed on the image side in the second lens unit. If the upper limit of the condition (4) is exceeded, the radius of curvature will be too large for obtaining favorable image flatness. If the lower limit of the condition (4) is exceeded, image quality will be remarkably influence due to an eccentricity of the lens component, thereby making it difficult to manufacture the lens component in practice.

The condition (5) defines a radius of curvature on the image side surface of the lens component disposed on the image side in the second lens unit. If the upper limit of the condition (5) is exceeded, the lens component disposed on the image side in the second lens unit will have a prolonged total length, thereby undesirably enlarging an influence on image quality due to eccentricity. If the lower limit of the condition (5) is exceeded, in contrast, off-axial aberrations produced by the eyepiece lens systems will be influenced and resolution will be degraded on a side where the afocal optical system has a higher magnification.

Moreover, it is desirable for correcting chromatic aberration to use a cemented lens component made of an extraordinary dispersing glass material in at least either of the second lens unit and the third lens unit.

Detailed Description of the Preferred Embodiments

Figure 1:
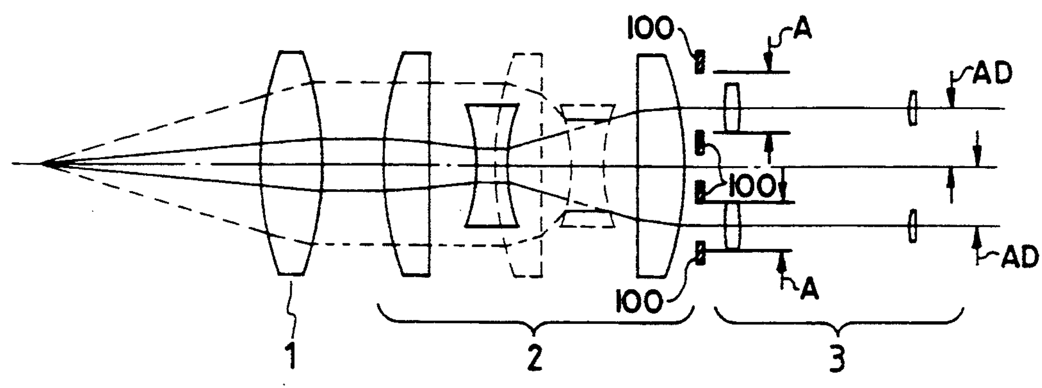
FIG. 1 shows a sectional view illustrating a fundamental composition of the stereomicroscope according to the present invention.

Now, the stereomicroscope according to the present invention will be described in more detail below with reference to the preferred embodiments illustrated in the accompanying drawings. Each of the embodiments which are to be described below is an afocal vari-focal optical system having the fundamental composition illustrated in FIG. 1 and has a concrete composition given as the following numerical data for use in the stereomicroscope according to the present invention:

| Embodiment 1 |
| --- |
| L = 1 |
| $r_1 = 0.5703$ |

-continued

| Embodiment 1 | | | |
|---|---|---|---|
| | $d_1 = 0.1042$ | $n_1 = 1.72916$ | $\nu_1 = 54.7$ |
| $r_2 = -0.5703$ | | | |
| | $d_2 = 0.0434$ | $n_2 = 1.85026$ | $\nu_2 = 32.3$ |
| $r_3 = -2.6165$ | | | |
| | $d3 = D_1$ | | |
| $r_4 = -0.2349$ | | | |
| | $d_4 = 0.0260$ | $n_4 = 1.816$ | $\nu_4 = 37.2$ |
| $r_5 = 0.1632$ | | | |
| | $d_5 = 0.0981$ | | |
| $r_6 = -0.1111$ | | | |
| | $d_6 = 0.0604$ | $n_6 = 1.74$ | $\nu_6 = 31.7$ |
| $r_7 = 0.0847$ | | | |
| | $d_7 = 0.0868$ | $n_7 = 1.834$ | $\nu_7 = 37.2$ |
| $r_8 = -0.1910$ | | | |
| | $d_8 = D_2$ | | |
| $r_9 = 1.1568$ | | | |
| | $d_9 = 0.0391$ | $n_9 = 1.80518$ | $\nu_9 = 25.4$ |
| $r_{10} = 0.5703$ | | | |
| | $d_{10} = 0.0551$ | $n_{10} = 1.48749$ | $\nu_{10} = 70.2$ |
| $r_{11} = -0.5703$ | | | |

| magnification of afocal optical system | $D_1$ | $D_2$ |
|---|---|---|
| 0.24x | 0.0389 | 0.2523 |
| 0.47x | 0.2844 | 0.1858 |
| 0.95x | 0.4073 | 0.0527 |

$A = 0.1$, $AD = 0.096$, $AP = 0.0174$, $-f_2/L = 0.180$, $f_c = 1.46$, focal lengths of objective providing adequate stereoscopic impressions $0.7 \leqq f_0 \leqq 4.6$, $-R_2/R_3 = -r_5/r_6 = 1.47$

| Embodiment 2 | | | |
|---|---|---|---|
| | $L = 1$ | | |
| $r_1 = 2.1545$ | | | |
| | $d_1 = 0.0672$ | $n_1 = 1.497$ | $\nu_1 = 81.6$ |
| $r_2 = -1.3645$ | | | |
| | $d_2 = 0.0018$ | | |
| $r_3 = 0.4308$ | | | |
| | $d3 = 0.1443$ | $n_3 = 1.497$ | $\nu_3 = 81.6$ |
| $r_4 = -0.8314$ | | | |
| | $d_4 = 0.0446$ | $n_4 = 1.84666$ | $\nu_4 = 23.8$ |
| $r_5 = -2.5344$ | | | |
| | $d_5 = D_1$ | | |
| $r_6 = -0.2728$ | | | |
| | $d_6 = 0.0223$ | $n_6 = 1.816$ | $\nu_6 = 46.6$ |
| $r_7 = 0.1510$ | | | |
| | $d_7 = 0.0683$ | | |
| $r_8 = -0.0911$ | | | |
| | $d_8 = 0.0366$ | $n_8 = 1.816$ | $\nu_8 = 46.6$ |
| $r_9 = -0.3363$ | | | |
| | $d_9 = 0.1071$ | $n_9 = 1.702$ | $\nu_9 = 40.1$ |
| $r_{10} = -0.1558$ | | | |
| | $d_{10} = D_2$ | | |
| $r_{11} = 0.8169$ | | | |
| | $d_{11} = 0.0357$ | $n_{11} = 1.7618$ | $\nu_{11} = 27.1$ |
| $r_{12} = 0.4332$ | | | |
| | $d_{12} = 0.0639$ | $n_{12} = 1.497$ | $\nu_{12} = 81.6$ |
| $r_{13} = -0.6197$ | | | |

| magnification of afocal optical system | $D_1$ | $D_2$ |
|---|---|---|
| 0.28x | 0.0536 | 0.2694 |
| 0.56x | 0.2108 | 0.1975 |
| 1.12x | 0.2894 | 0.0536 |

$A = 0.107$, $AD = 0.098$, $AP = 0.0179$, $-f_2/L = 0.150$, $f_c = 1.5$, focal lengths of objective providing adequate stereoscopic impressions $0.914 \leqq f_0 \leqq 5.99$, $-R_2/R_3 = -r_7/r_8 = 1.66$

| Embodiment 3 | | | |
|---|---|---|---|
| | $L = 1$ | | |
| $r_1 = 5.8142$ | | | |
| | $d_1 = 0.0530$ | $n_1 = 1.72916$ | $\nu_1 = 54.7$ |
| $r_2 = -1.4358$ | | | |
| | $d_2 = 0.0047$ | | |
| $r_3 = 0.4237$ | | | |
| | $d3 = 0.1067$ | $n_3 = 1.72916$ | $\nu_3 = 54.7$ |
| $r_4 = -7.4674$ | | | |
| | $d_4 = 0.0474$ | $n_4 = 1.84666$ | $\nu_4 = 23.8$ |
| $r_5 = 1.0664$ | | | |
| | $d_5 = D_1$ | | |
| $r_6 = -0.4122$ | | | |
| | $d_6 = 0.0237$ | $n_6 = 1.816$ | $\nu_6 = 46.6$ |
| $r_7 = 0.0857$ | | | |
| | $d_7 = 0.1043$ | | |
| $r_8 = -0.1173$ | | | |
| | $d_8 = 0.0511$ | $n_8 = 1.6445$ | $\nu_8 = 40.8$ |
| $r_9 = -0.4213$ | | | |
| | $d_9 = 0.0996$ | $n_9 = 1.497$ | $\nu_9 = 81.6$ |
| $r_{10} = -0.1450$ | | | |
| | $d_{10} = D_2$ | | |
| $r_{11} = 1.0799$ | | | |
| | $d_{11} = 0.0380$ | $n_{11} = 1.741$ | $\nu_{11} = 52.7$ |
| $r_{12} = 0.4471$ | | | |
| | $d_{12} = 0.0752$ | $n_{12} = 1.497$ | $\nu_{12} = 81.6$ |
| $r_{13} = -0.5318$ | | | |

| magnification of afocal optical system | $D_1$ | $D_2$ |
|---|---|---|
| 0.24x | 0.0569 | 0.2281 |
| 0.48x | 0.2120 | 0.1710 |
| 0.96x | 0.2895 | 0.0569 |

$A = 0.114$, $AD = 0.104$, $AP = 0.0190$, $-f_2/L = 0.133$, $f_c = 1.59$, focal lengths of the objective lens providing adequate stereoscopic impressions being $0.835 \leqq f_0 \leqq 5.47$, $-R_2/R_3 = -r_7/r_8 = 0.73$ wherein the reference symbols $r_1, r_2, \ldots$ represent radii of curvature on the respective lens components, the reference numeral $d_1, d_2, \ldots$ designate thicknesses of the respective lens components and an airspace reserved therebetween, the reference symbols $n_1, n_2, \ldots$ denote refractive indices of the respective lens components, the reference symbols $\mu_1, \mu_2, \ldots$ represent Abbe's numbers of the respective lens components, and the reference symbol $f_c$ designates a focal length of an imaging lens system.

Figure 2:
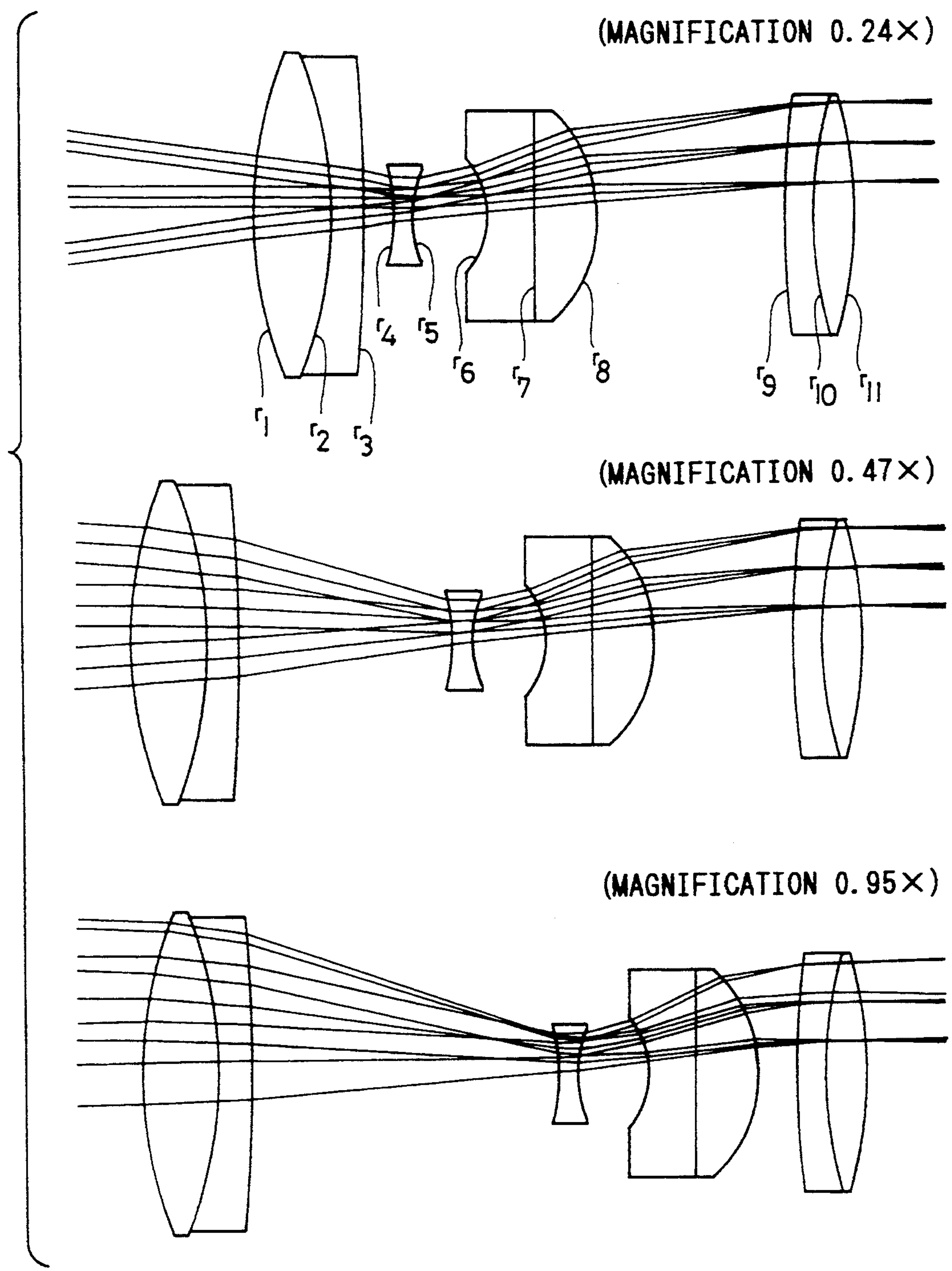
FIGS. 2 through FIG. 4 show sectional views illustrating rating compositions of a first through fourth embodiments of the afocal vari-focal optical system to be used in the stereomicroscope according to the present invention.
Figure 3:
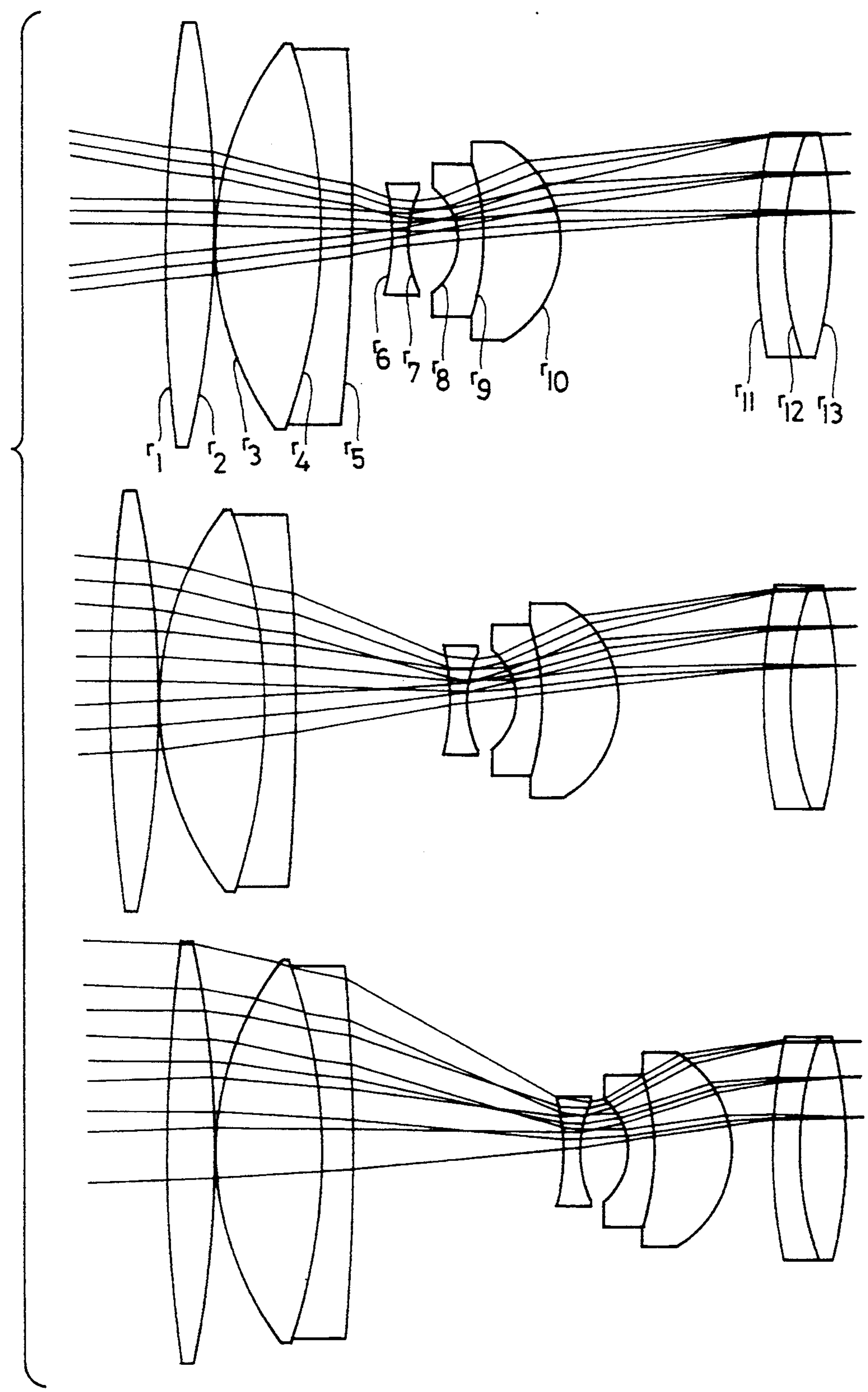
Figure 4:
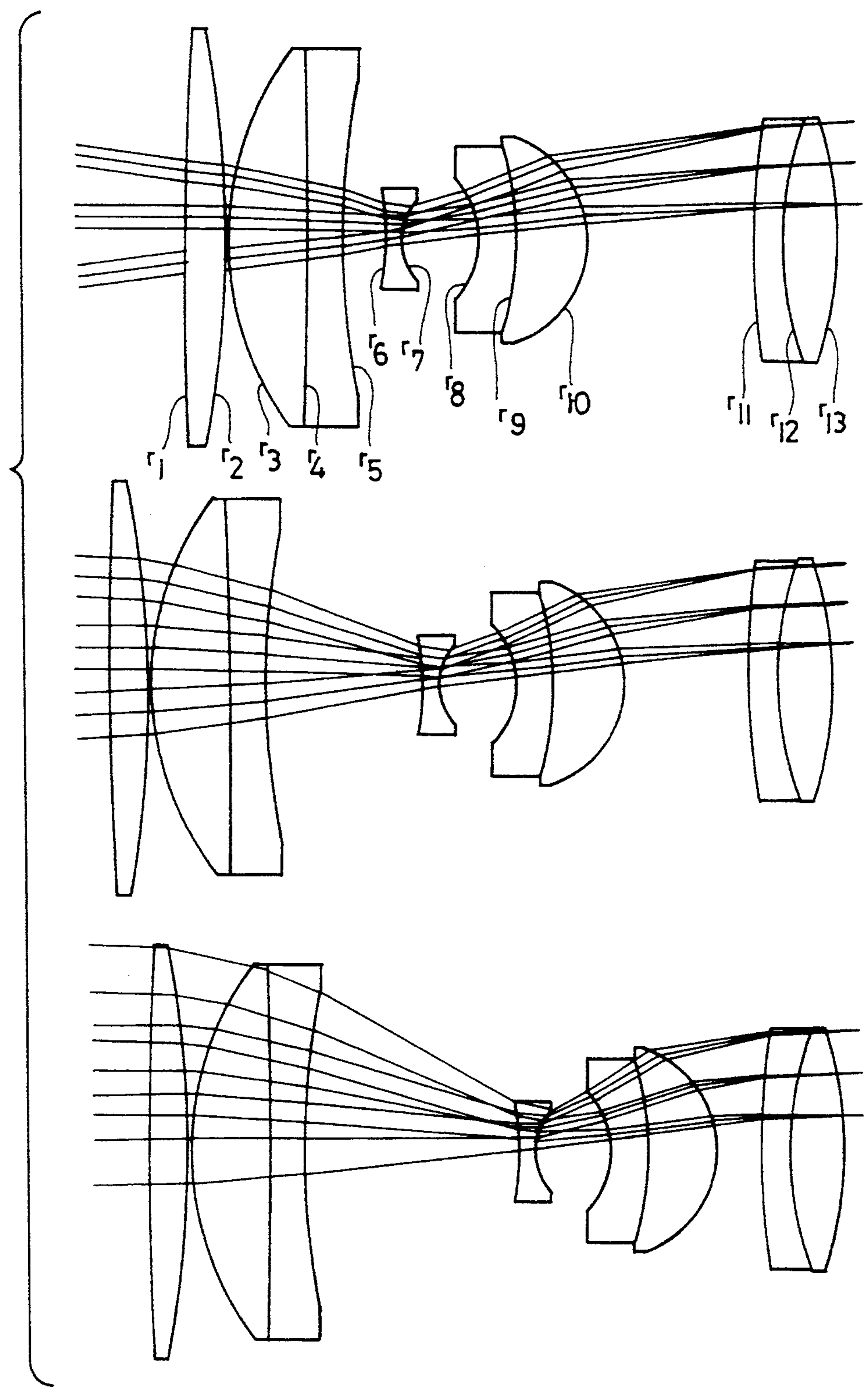

FIG. 2, FIG. 3 and FIG. 4 show sectional views illustrating compositions of a first embodiment, a second embodiment and a third embodiment of the stereomicroscope according to the present invention. Though only the afocal vari-focal optical system is shown in each of these drawings, it is needless to say that an objective lens is disposed on the side of incidence (the left side in the drawing) of the afocal vari-focal optical system, whereas imaging lenses, eyepiece lens systems and so on are disposed on the side of emergence (the right side) of the afocal vari-focal optical system.

The numerical data of the embodiments described above are normalized to a maximum length L of the afocal vari-focal optical system. Further, the graphs illustrating the aberration characteristics are traced by using values which are obtained when a center line between the optical axes of the right and left eyepiece lens system is coincident with the optical axis of the afocal varifocal optical system. In other words, the reference symbol AD represents an eccentricity of the optical axis of the afocal vari-focal optical system from each of the optical axes of the eyepiece lens systems. Furthermore, the reference symbol A represents a diameter of an aperture stop for the eyepiece lens systems, and the reference symbol AP designates an airspace reserved between the aperture stop for the eyepiece lens systems and a final surface of the afocal vari-focal optical system.

Further, spherical aberration is represented as values measured on a plane including the right and left optical axes, whereas astigmatism is represented in two types: one in the right-left direction (on the plane including the right and left optical axes of the eyepiece lens systems) and the other in the up-down direction (the direction perpendicular to the plane mentioned above). These aberrations are represented as values on an image surface of an imaging lens system when the eyepiece lens systems are combined with an imaging lens system having a focal length of $f_c$.

Figure 5:
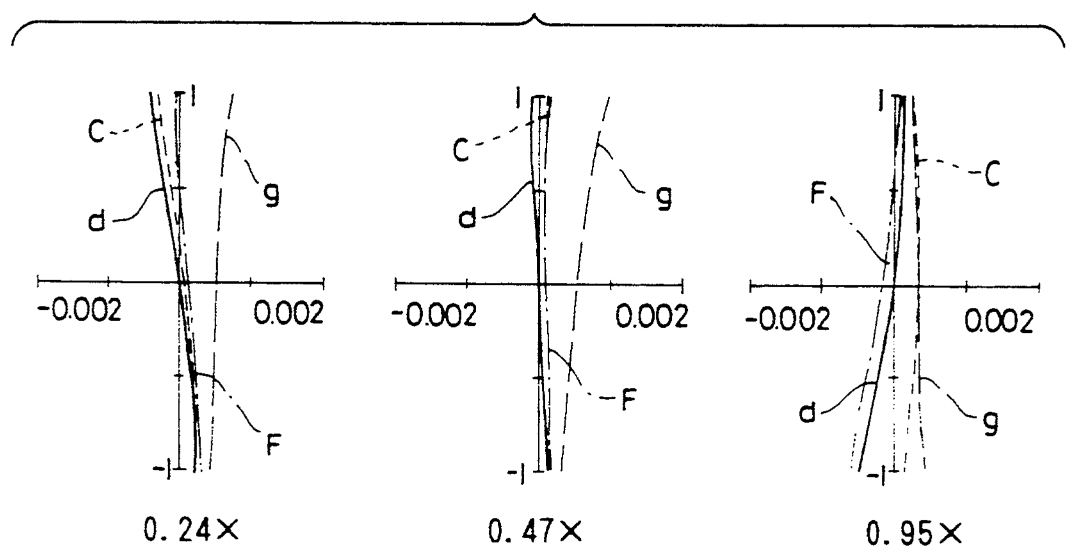
FIG. 5 shows curves illustrating spherical aberration in the first embodiment of the afocal vari-focal optical system.
Figure 6:
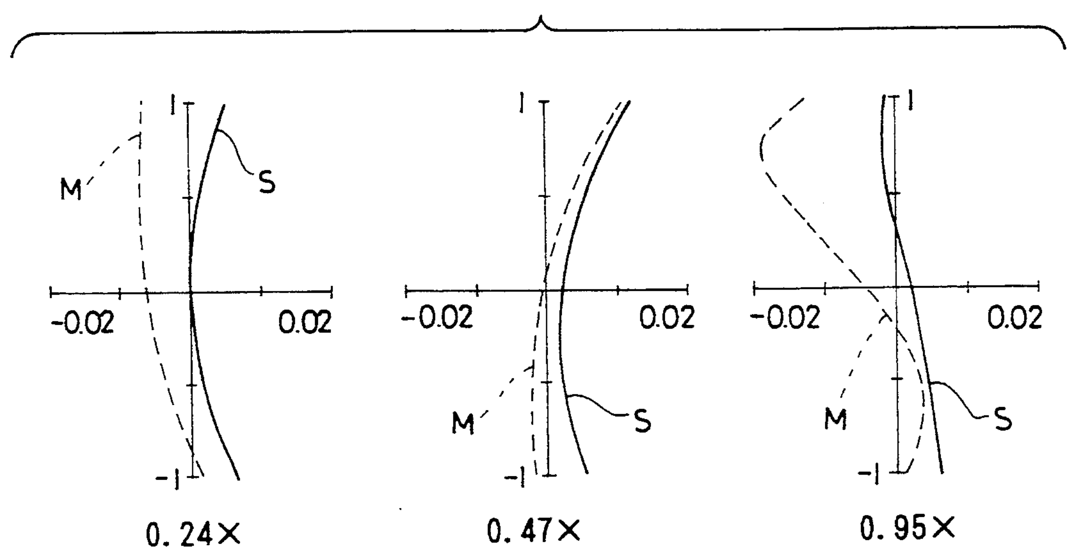
FIG. 6 shows graphs illustrating astigmatism in a right-left direction in the first embodiment.
Figure 7:
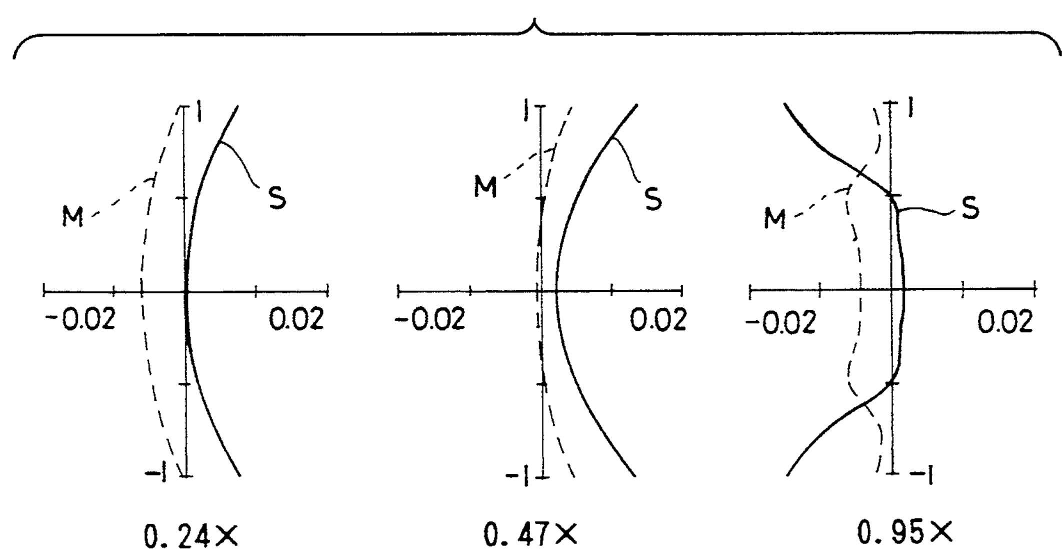
FIG. 7 shows graphs illustrating astigmatism in an up-down direction in the first embodiment.
Figure 8:
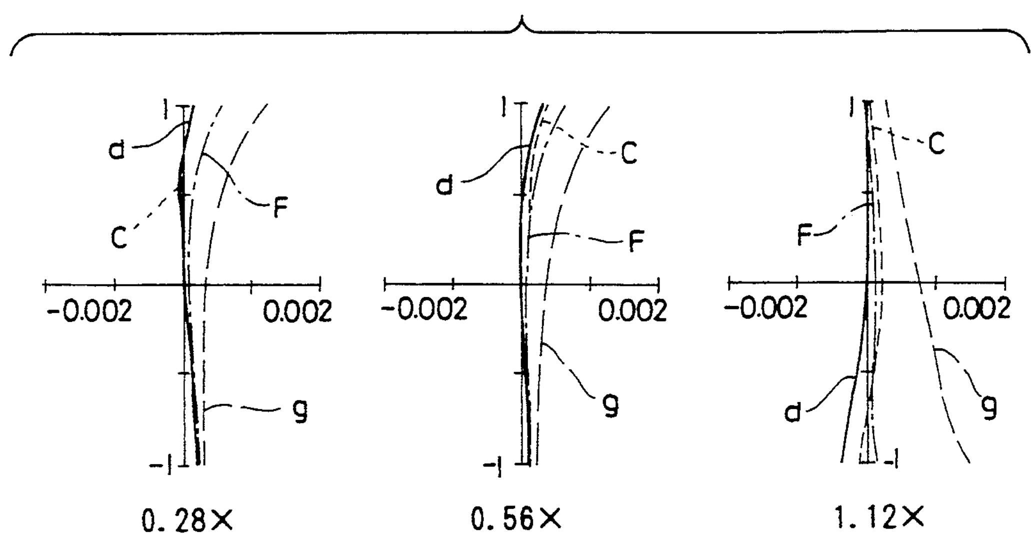
FIG. 8 shows curves illustrating spherical aberration in the second embodiment of the afocal vari-focal optical system.
Figure 9:
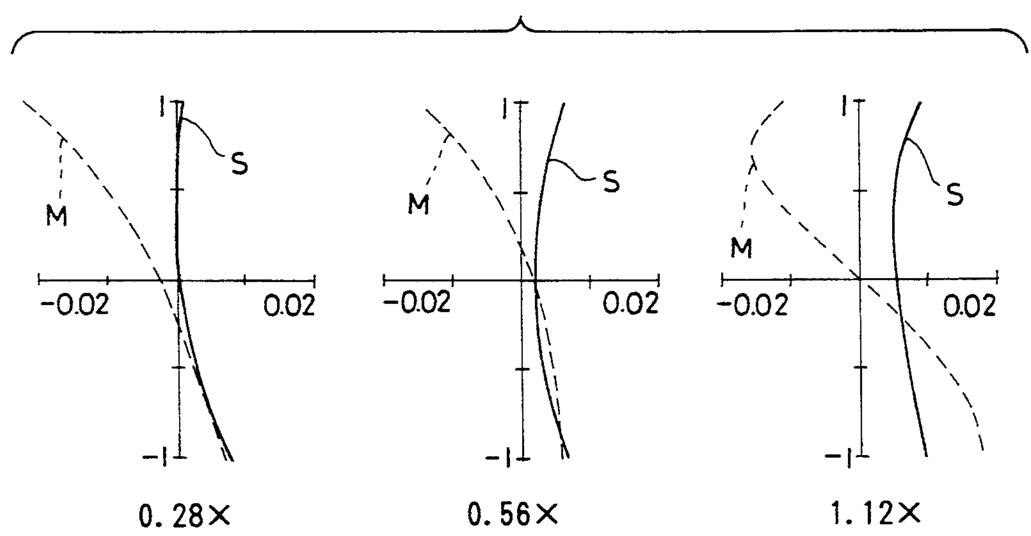
FIG. 9 shows graphs illustrating astigmatism in the right-left direction in the second embodiment.
Figure 10:
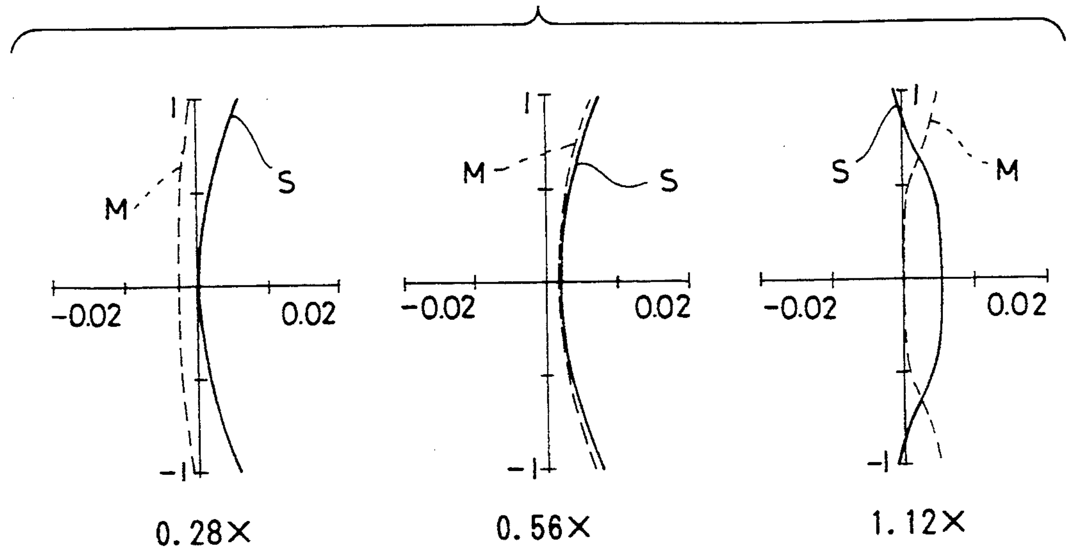
FIG. 10 shows graphs illustrating astigmatism in the up-down direction in the second embodiment.
Figure 11:
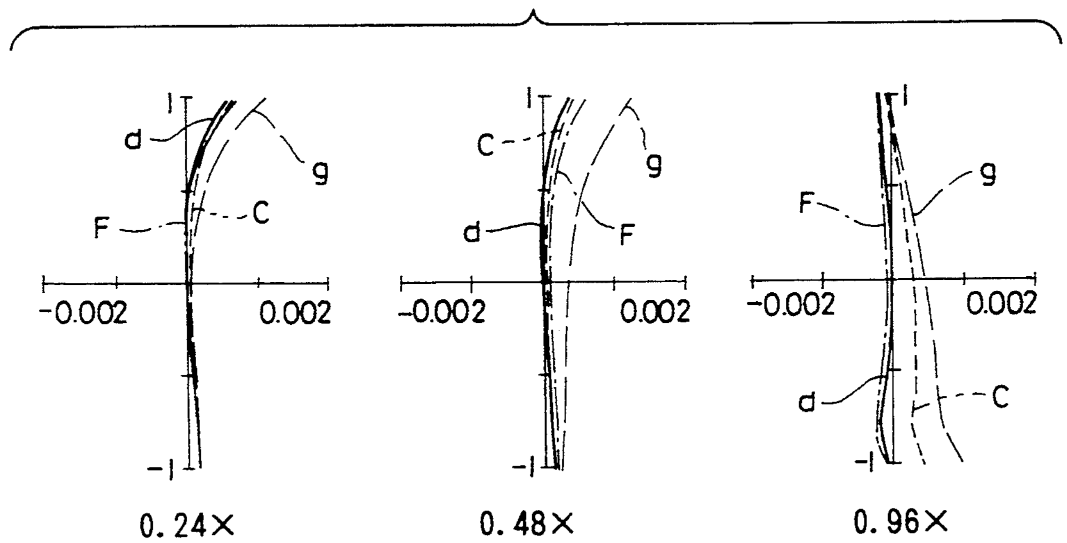
FIG. 11 shows curves illustrating spherical aberration in the third embodiment of the afocal vari-focal optical system.
Figure 12:
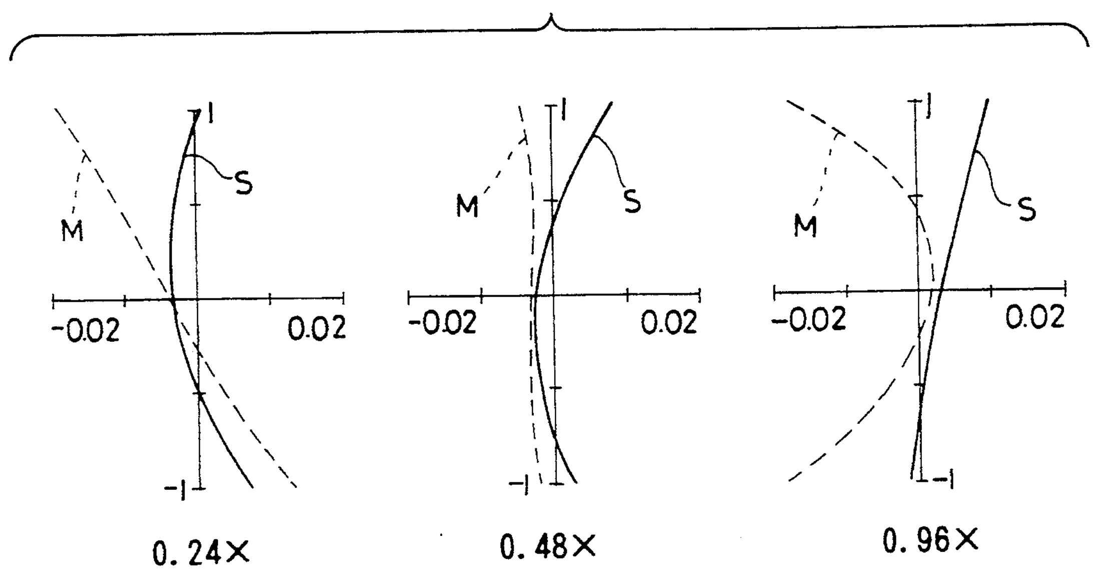
FIG. 12 shows graphs illustrating astigmatism in the right-left direction in the third embodiment.
Figure 13:
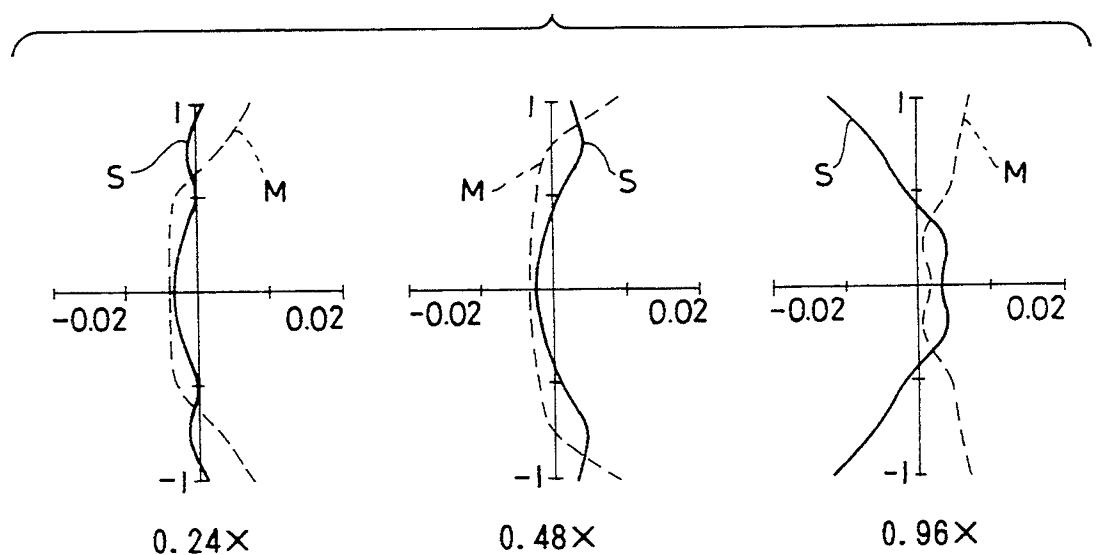
FIG. 13 shows graphs illustrating astigmatism in the up-down direction in the third embodiment.

Out of the curves illustrating the aberrations, FIG. 5, FIG. 6 and FIG. 7 represent aberration characteristics of the first embodiment, FIG. 8, FIG. 9 and FIG. 10 represent aberration characteristics of the second embodiment, and FIG. 11, FIG. 12 and FIG. 13 represent aberration characteristics of the third embodiment.

The stereomicroscope according to the present invention uses the afocal vari-focal optical system, and therefore provides images having adequate sizes with favorable stereoscopic impression though the microscope adopts an eccentric vari-focal optical system.

I claim:

1. A stereomicroscope comprising:

an objective lens having an objective lens optical axis disposed to have a front focal point nearly coincident with an object point;

an afocal vari-focal optical system having an afocal vari-focal optical axis coincident to said objective lens optical axis;

a pair of imaging optical systems each for imaging a parallel radiation bundle emerging from said afocal varifocal optical system, each of said pair of imaging optical systems having an imaging optical axis non-coincident with said afocal vari-focal optical axis; and a pair of eyepiece lens systems for respectively magnifying an image formed by each of said pair of imaging optical systems, each of said pair of eyepiece lens systems having an eyepiece optical axis non-coincident with said afocal vari-focal optical axis;

said stereomicroscope satisfying the following condition (1):

$$0.005 \leqq AD \cdot \beta / f_0 \leqq 0.131 \quad (1)$$

wherein said reference symbol $\beta$ represents an afocal magnification of said afocal vari-focal optical system, said reference symbol AD designates a distance between each of said eyepiece optical axes and said afocal vari-focal optical axis, and said reference symbol $f_0$ denotes a focal length of said objective lens.

2. A stereomicroscope according to claim 1, wherein said afocal vari-focal optical system comprises: a first lens unit having a positive refractive power;

a second lens unit having a negative refractive power; and a third lens unit having a positive refractive power;

said stereomicroscope satisfying the following condition (2):

$$0.1 \leqq -f_2/L \leqq 0.25 \quad (2)$$

wherein said reference symbol $f_2$ represents a focal length of said second lens unit, and said reference symbol L designates a maximum length of said afocal vari-focal optical system.

3. A stereomicroscope according to claim 2, wherein said afocal vari-focal optical system satisfies the following conditions:

$$AD/L \leqq 0.15$$

$$A/L \leqq 0.15$$

wherein said reference symbol A represents a diameter of an entrance pupil of each of said pair of eyepiece lens systems.

4. A stereomicroscope according to any one of claims 2 or 3, wherein said second lens unit includes a first and a second lens component disposed on object and image sides of said second lens unit, respectively, and satisfies the following conditions (3) through (5):

$$0.523 \; -R_2/R_3 \leqq 2 \quad (3)$$

$$0.07 \leqq -R_3/L \leqq 0.2 \quad (4)$$

$$0.12 \leqq -R_4/L \leqq 0.25 \quad (5)$$

wherein said reference symbol $R_2$ represents a radius of curvature of an image side surface of said first lens component, and said reference symbols $R_3$ and $R_4$ designate radii of curvature of an object side surface and an image side surface, respectively, of said second lens component.

5. A stereomicroscope according to claim 1, wherein said afocal vari-focal optical system comprises, in order from an object side thereof:

a first lens unit having a positive refractive power, and comprising a positive lens component and a first cemented doublet;

a second lens unit having a negative refractive power, and comprising a negative lens component and a second cemented doublet; and a third lens unit comprising a third cemented doublet having a positive refractive power;

wherein a magnification of said stereomicroscope is changed by moving said first lens unit and said second lens unit along said afocal vari-focal optical axis.

6. A stereomicroscope according to claim 1, wherein said afocal vari-focal optical system comprises, in order from an object side thereof:

a first lens unit having a positive refractive power, and a first cemented doublet;

a second lens unit having a negative refractive power, and comprising a negative lens component and a second cemented doublet; and a third lens unit comprising a third cemented doublet having a positive refractive power;

wherein a magnification of said stereomicroscope is changed by moving said first lens unit and said second lens unit along said afocal vari-focal optical axis.

7. A stereomicroscope according to any one of claims 5 or 6, wherein:

said second cemented doublet disposed in said second lens unit is a meniscus lens component having a convex surface on an image side thereof; and said second cemented doublet and said negative lens component disposed in said second lens unit are disposed so as to have concave surfaces which are opposed to each other.

* * * * *